United States Patent
Fang et al.

(10) Patent No.: US 11,636,268 B2
(45) Date of Patent: Apr. 25, 2023

(54) GENERATING FINITE STATE AUTOMATA FOR RECOGNITION OF ORGANIC COMPOUND NAMES IN CHINESE

(71) Applicant: FUJITSU LIMITED, Kawasaki (JP)

(72) Inventors: Lu Fang, Beijing (CN); Zhongguang Zheng, Beijing (CN); Yingju Xia, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 309 days.

(21) Appl. No.: 16/879,252

(22) Filed: May 20, 2020

(65) Prior Publication Data
US 2021/0073470 A1    Mar. 11, 2021

(30) Foreign Application Priority Data
Sep. 6, 2019  (CN) .......................... 201910842145.9

(51) Int. Cl.
*G06F 40/289*    (2020.01)
*G06N 5/04*      (2023.01)
*G06N 20/00*     (2019.01)

(52) U.S. Cl.
CPC ............. *G06F 40/289* (2020.01); *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | | |
|---|---|---|---|---|
| 6,311,152 B1* | 10/2001 | Bai | ........................ | G06F 40/289 704/251 |
| 7,676,358 B2* | 3/2010 | Coden | .................... | G06F 40/295 704/4 |
| 2007/0016612 A1* | 1/2007 | James | ..................... | G16C 20/40 |
| 2011/0082844 A1* | 4/2011 | Bao | ......................... | G06F 40/232 707/697 |
| 2013/0054226 A1* | 2/2013 | Chen | ...................... | G06F 40/279 704/8 |
| 2019/0272319 A1* | 9/2019 | Shi | .......................... | G06F 40/284 |

OTHER PUBLICATIONS

Sayle et al. "Improved Chemical Text Mining of Patents with Infinite Dictionaries and Automatic Spelling Correction". Journal of Chemical Information and Modeling, 2012, 52, 51-62 (Year: 2012).*

* cited by examiner

*Primary Examiner* — Jesse S Pullias
(74) *Attorney, Agent, or Firm* — Staas & Halsey LLP (57) ABSTRACT

The present disclosure relates to a method and device for generating a finite state automata for recognizing a chemical name in a text, and a recognition method. According to an embodiment of the present disclosure, the method comprises substituting representation constants of categories of character segments appearing in an organic compound name set into the organic compound name set to obtain a conversion name set; updating the conversion name set based on a conversion name segment which repeatedly appears in the conversion name set; and generating the finite state automata based on the updated conversion name set.

13 Claims, 5 Drawing Sheets

GENERATING FINITE STATE AUTOMATA FOR RECOGNITION OF ORGANIC COMPOUND NAMES IN CHINESE

CROSS-REFERENCE TO RELATED APPLICATIONS

This application claims the priority benefit of Chinese Patent Application No. 201910842145.9, filed on Sep. 6, 2019 in the China National Intellectual Property Administration, the disclosure of which is incorporated herein in its entirety by reference.

FIELD

The present disclosure relates to character recognition, and particularly, to a method and device for generating a finite state automata for recognizing a chemical name in a text, and a recognition method for recognizing a chemical name in a text.

BACKGROUND

In recent years, with the rapid development of technology in the field of chemistry, related literature such as scientific papers and patents in various branches of the field of chemistry has been increasing. Chemical text mining technology and chemical name recognition technology are becoming more and more important. Many scholars have studied the main use of machine learning and rule-based methods for chemical name recognition.

However, the machine learning requires a large number of manually identified corpora. The rule-based methods require specific expertise to plan complicated rules.

SUMMARY

A brief summary of the present disclosure will be given below to provide a basic understanding of some aspects of the present disclosure. It should be understood that the summary is not an exhaustive summary of the present disclosure. It does not intend to define a key or important part of the present disclosure, nor does it intend to limit the scope of the present disclosure. The object of the summary is only to briefly present some concepts, which serves as a preamble of the more detailed description that follows.

The present invention provides a method for recognizing a chemical name using a finite state automata for recognizing a chemical name in a text. The method can include automatically generating a rule from a dictionary of chemical names.

According to an aspect of the present disclosure, there is provided a method for generating a finite state automata for recognizing a chemical name in a text, the method comprising initializing including substituting representation constants of categories of character segments appearing in an organic compound name set into the organic compound name set to obtain a conversion name set; updating the conversion name set based on a conversion name segment which repeatedly appears in the conversion name set; and generating the finite state automata based on the updated conversion name set; wherein respective organic compound names in the organic compound name set are in Chinese.

According to an aspect of the present disclosure, there is provided a recognition method for recognizing a chemical name in a text, characterized in that the recognition method comprises: acquiring the text; performing recognition on the text using a finite state automata generated by the aforementioned method for generating a finite state automata, to extract an organic compound chemical name in the text; and outputting a recognition result comprising the extracted organic compound chemical name.

According to another aspect of the present disclosure, there is provided a device for generating a finite state automata, where the device comprises: a memory and a processor coupled to the memory. The processor is configured to initializing to substitute representation constants of categories of character segments appearing in an organic compound name set into the organic compound name set to obtain a conversion name set; updating the conversion name set based on a conversion name segment which repeatedly appears in the conversion name set; and generating the finite state automata based on the updated conversion name set; wherein respective organic compound names in the organic compound name set are in Chinese.

According to yet another aspect of the present disclosure, there is provided a storage medium with a program stored thereon, where when the program is executed on an information processing apparatus, causes the information processing apparatus to execute the following: initializing including substituting representation constants of categories of character segments appearing in an organic compound name set into the organic compound name set to obtain a conversion name set; updating the conversion name set based on a conversion name segment which repeatedly appears in the conversion name set; and generating the finite state automata for recognizing a chemical name in a text, based on the updated conversion name set; wherein respective organic compound names in the organic compound name set are in Chinese.

The method, device and storage medium according to the present disclosure at least can help to achieve one of the following effects: the methods for automatically generating a recognition rule and generating a finite state automata are simple, the efficiency of recognizing chemical names is high, and the recognition rate is high.

BRIEF DESCRIPTION OF THE DRAWINGS

Embodiments of the present disclosure will be described below with reference to the drawings, which will help to more easily understand the above and other objects, features, and advantages of the present disclosure. The drawings are only for purposes of illustrating the principles of the present disclosure. It is not necessary to draw the dimensions and relative positions of the units to scale in the drawings. The same reference numerals may denote the same features. In the drawings.

EMBODIMENTS OF THE INVENTION

Hereinafter, exemplary embodiments of the present disclosure will be described in conjunction with the drawings. For the sake of clarity and conciseness, the specification does not describe all features of actual embodiments. However, it should be understood that in developing any such actual embodiment, many decisions specific to the embodiments may be made in order to achieve specific objects of the developer, and these decisions may vary as the embodiments are different.

It should also be noted herein that, to avoid the present disclosure from being obscured due to unnecessary details, only those device structures closely related to the solution according to the present disclosure are shown in the drawings, while omitting other details not closely related to the present disclosure.

It should be understood that the present disclosure will not be limited only to the described implementations due to the following description made with reference to the drawings. In this disclosure, where feasible, embodiments may be combined with each other, features between different embodiments may be replaced or borrowed, and one or more features may be omitted in one embodiment.

An embodiment of the present disclosure provides a method for generating a finite state automata for recognizing a chemical name in a text. The method will be described with reference to FIG. 1 below.

Figure 1:
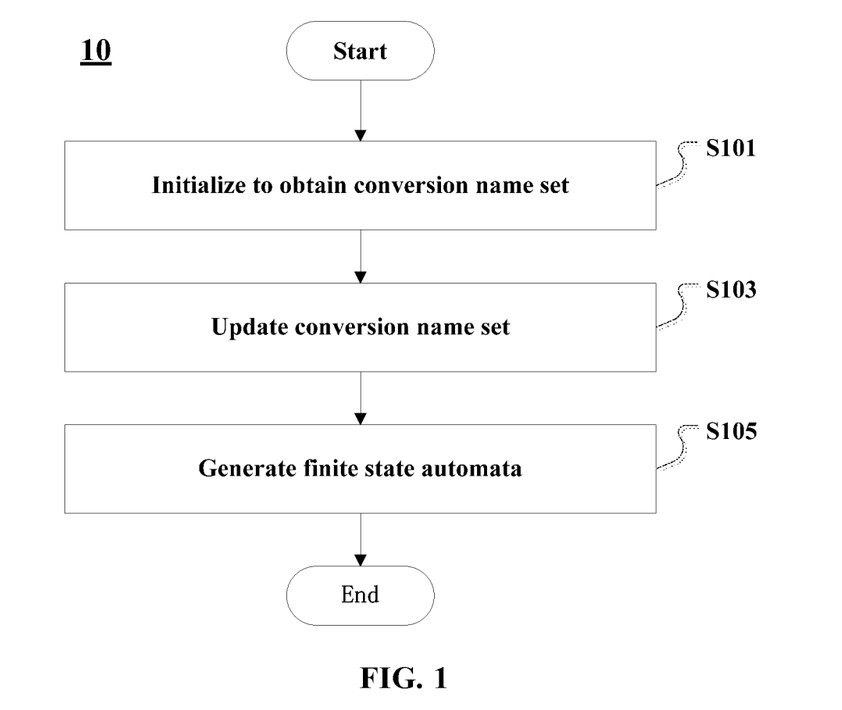
FIG. 1 shows a flowchart of a method for generating a finite state automata according to an embodiment of the present disclosure.

FIG. 1 shows a flowchart of a method 10 for generating a finite state automata according to an embodiment of the present disclosure. The finite state automata is used for recognizing a chemical name in a text.

Operation S101 is an initializing operation. This operation includes substituting representation constants $R\_ij$ of categories $C\_ij$ of character segments $Ch\_ij$ appearing in an organic compound name set$\{N\_i\}$ into the organic compound name set $\{N\_i\}$ to obtain a conversion name set $\{N'\_i\}$, wherein i, j are indices. The organic compound name set comprises names $N\_1, N\_2 \ldots, N\_i, \ldots$ of various organic compounds. In the present disclosure, the organic compound name set can be represented by IN Respective organic compound names in the organic compound name set are in Chinese. Representation constants are mentioned many times in the method 10. Each representation constant can be used for uniformly representing a certain category of character segments containing a single character which appear in the organic compound name set, or for uniformly representing a certain category of character segments containing multiple characters which appear in the organic compound name set. That is, a certain category of character segments is represented by a constant, which is named a "representation constant". A representation constant can be used for representing a sequence of two representation constants or for representing a character segment sequence represented by a sequence of two representation constants. For example, a first representation constant $c001 is used for representing a first category of character segments, a second representation constant $c002 is used for representing a second category of character segments, and accordingly a character segment sequence "the first category of character segments the second category of character segments" (also referred to as, a third category of character segments) can be represented by "$c001$c002", and a third representation constant $c003 can also be defined for representing the third category of character segments. It should be noted that the foregoing expression manners of the representation constants are only examples. The operation of substituting representation constants of categories of character segments appearing in an organic compound name set into the organic compound name set to obtain the conversion name set is also referred to as an initializing substitution operation.

The organic compound names in the organic compound name set can originate from textbooks, dictionaries, dissertations, etc. The selection of the organic compound names in the organic compound name set can be determined according to the specific application scenario of the finite state automata. For example, if it is desired that the finite state automata is able to recognize sugars in the text, collected names of sugar organic compounds can be used to form the organic compound name set. Preferably, the organic compounds in the organic compound name set IN originate, for example, from organic compound chemical dictionaries, organic compound chemical handbooks, etc.

As examples, the representation constants $R\_ij$ of the categories $C\_ij$ of the character segments $Ch\_ij$ appearing in the organic compound name set $\{N\_i\}$ can adopt the following manners:

Arabic numbers, with representation constants being $digit, for representing any one of Arabic number characters 0, 1, 2, 3, 4, 5, 6, 7, 8, and 9;

Chinese numbers, with representation constants being $cdigit, for representing any one of Chinese number characters 一, 二, 三, 四, 五, 六, 七, 八, 九 and 十 (one, two, three, four, five, six, seven, eight, nine and ten);

Heavenly stems, with representation constants being $tiangan, for representing any one of heavenly stems characters 甲, 乙, 丙, 丁, 戊, 己, 庚, 辛, 壬 and 癸;

Uppercase letters, with representation constants being $upper, for representing any one of uppercase English alphabetic characters A, B, C, D, E, F, G, H, I, J, K, L, M, N, O, P, Q, R, S, T, U, V, W, X, Y and Z;

Lowercase letters, with representation constants being $lower, for representing any one of lowercase English alphabetic characters a, b, c, d, e, f, g, h, i, j, k, l, m, n, o, p, q, r, s, t, u, v, w, x, y and z;

Greek letters, with representation constants being $greek, for representing any one of Greek alphabetic characters α, β, γ, δ, ε, ζ, η, θ, ι, κ, λ, μ, ν, ξ, ο, π, ρ, σ, τ, υ, φ, χ . . . ;

Order characters, with representation constants being $order, for representing any one of order word characters 伯, 仲, 叔 and 季 (primary, secondary, tertiary and quaternary);

Prefixes, with representation constants being $prefix, for representing any one of characters 联, 聚, 脱, 增, 环, 断, 正, 异, 新, 顺, 反, 映, 邻, 间, 对 and 迫 (linkage, poly, anhydro-, homo-, cyclo-, seco-, normal, iso-, normal, cis, trans, enantio-, ortho, meta, para and peri);

Conjunctions, with representation constants being $midfix, for representing any one of characters 化, 代, 杂, 合, 并 and 缩 (transform, substitute, hybridization, union, merge and contraction);

Suffixes, with representation constants being $suffix, for representing any one of 基, 叉基, 亚基, 爪基, 基亚基, 次基, 山由基 and 根 (-yl, -diyl, -ylidene, -triyl, -ylylidene, -ylidyne, free radical and radical);

Chemical elements, with representation constants being $element, for representing a single chemical element Chinese character such as characters 氢, 氦, 锂, 铍, 硼, 碳, 氮, 氧, 氟, 氖, 钠, 镁, 铝, 硅, 磷, 硫, 氯, 氩, 钾, 钙 (hydrogen, helium, lithium, beryllium, boron, carbon, nitrogen, oxygen, fluorine, neon, sodium, magnesium, aluminum, silicon, phosphorus, sulfur, chlorine, argon, potassium, calcium) and the like;

Punctuation marks, including: ",", ".", ":", ";", "(", ")", "[", "]", "{", "}", """; wherein the various types of punctuation marks have representation constants $punc_b, or are represented by the punctuation marks themselves, wherein b is an index, and a different index is assigned for each punctuation mark;

Other common words, with representation constants being $chem, for representing other chemical common character segments, such as 烷, 烯, 炔, 酸, 酯, 胺, 酰, 酮, 醇, 羧, 苯, 卞, 茚, 萘, 噻, 呋, 喃, 咪, 啶, 嗪, 嘧, 哒, 吲, 哚 (alkane, olefince, alkyne, acid, ester, amine, acyl, ketone, alcohol, carboxyl, benzene, benzyl, indene, naphthalene, thi-, fur-, -an, imi-, -dine, -zine, -mi-, -da-, in-, -dole) and the like.

Note that the above classification manners are only examples, and other classification manners can also be adopted.

For the convenience of discussion, the above-mentioned representation constants can be expressed in the following manner: D, C, T, U, L, G, O, P, M, S, E, punctuation mark itself, H. After the initializing substitution operation is performed, the conversion name of the obtained organic compound name "4-(4-氯苯基)-3-甲基-1-氢-吡唑" ("4-(4-chlorophenyl)-3-methyl-1-hydro-pyrazole") is, for example, "D-(D-EHS)-D-TS-D-E-HH", and the conversion name of the obtained organic compound name "trans-1,2-cyclopropanedicarboxylic acid" is, for example, "P-D,D-PTHCHH".

Operation S103 is an updating operation. In this operation, the conversion name set is updated based on a conversion name segment which repeatedly appears in the conversion name set $\{N'\_i\}$. This is advantageous for obtaining an efficient and simplified finite state automata.

Operation 105 is a generating operation. In this operation, the finite state automata is generated based on the updated conversion name set. Further, the generating operation S105 comprises: generating a regular expression based on the conversion name set; and generating the finite state automata based on the regular expression.

Those skilled in the art could appreciate that there may be many variations to the method 10. A further detailed exemplary implementation of the method 10 will be described below with reference to FIG. 2.

Figure 2:
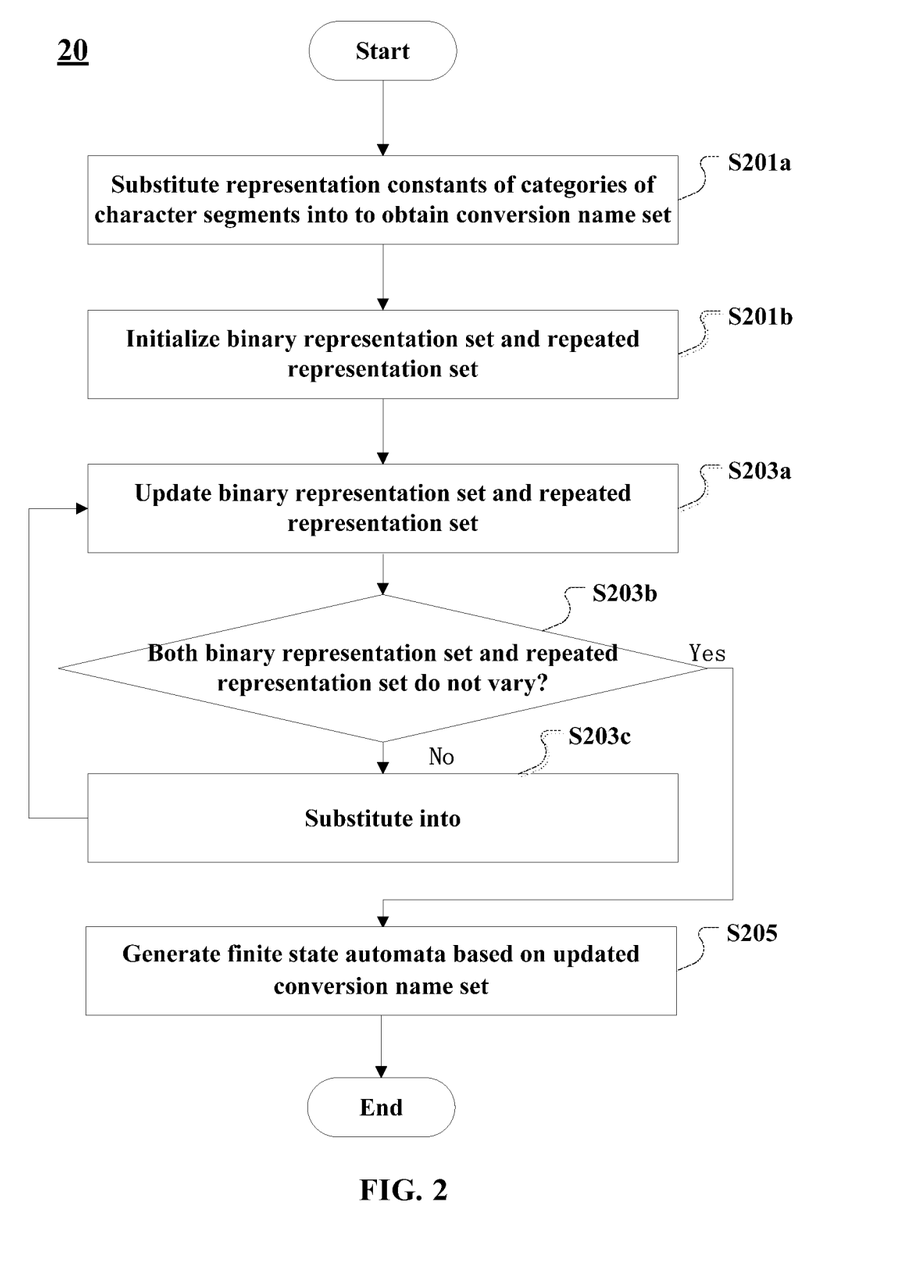
FIG. 2 shows a flowchart of a method for generating a finite state automata according to an embodiment of the present disclosure.

FIG. 2 shows a flowchart of a method 20 for generating a finite state automata according to an embodiment of the present disclosure.

In operation S201a, representation constants of categories of character segments appearing in an organic compound name set are substituted into the organic compound name set to obtain a conversion name set.

In operation S201b, a binary representation set $\{Sd\_k\}$ and a repeated representation set $\{Sr\_m\}$ are initialized, wherein k, m are indices. For example, the binary representation set and the repeated representation set are initialized to empty sets.

An element Sd_k in the binary representation is used for representing a conversion name segment of two adjacent representation constants in the conversion name set being different. For example, for the conversion name "P-D,D-PTHCHH", the following binary representations can be obtained: "P-", "-D", "D,", ",D", "D-", "-P", "PT", "TH", "HC", "CH". A unique representation constant, such as "$pbar=P-" and "$bard=-D", can be set for each binary representation.

An element Sr_m in the repeated representation set is used for representing a conversion name segment in the conversion name set where the same representation constant continuously appears. For example, the conversion name set includes the conversion name "UD-HSHHHHH", wherein the representation constant "H" continuously appears 5 times, so a representation constant $hhs<H> can be defined. $hhs can be used for representing a conversion name segment in the conversion name set where the representation constant "H" continuously and repeatedly appears. $hhs can be used for representing a category of character segments: character segments composed of a plurality of representation constants "H".

Operations S201a and S201b can be collectively called an initializing operation.

In operation S203, the binary representation set and the repeated representation set are updated, comprising: a binary representation updating operation and a repeated representation updating operation. For the binary representation updating operation, the following processing is performed: determining a conversion name segment of two adjacent representation constants in the conversion name set being different and setting a corresponding representation constant for the two adjacent representation constants as a binary representation to update a binary representation set, wherein respective binary representations in the binary representation set satisfy: a time for which a conversion name segment to which the binary representation correspond appear in the conversion name set is greater than a first predetermined threshold Th1. The first predetermined threshold Th1 can be set according to a size of the organic compound name set. When the organic compound name set contains more organic compound names, Th1 can be set to be larger, and otherwise Th1 can be set to be smaller. For example, when a time for which the conversion name segment "$c001$c002" appears in the conversion name set is larger than Th1, the representation constant "$c003" is set as a binary representation, and is recorded in the binary representation set. The binary representation set includes all binary representations in the current conversion name that satisfy the condition. Optionally, times Num_k (also referred to as first times) for which conversion name segments to which respective binary representations Sd_k correspond appear in the conversion name set are recorded. For the repeated representation updating operation, the following processing is performed: determining a conversion name segment in the conversion name set where the same representation constant continuously appears for n times or more than n times and setting a corresponding representation constant for the same representation constant as a repeated representation to update a repeated representation set, wherein each repeated representation in the repeated representation set is capable of collectively representing a conversion name segment in which the same representation constant to which the repeated representation corresponds continuously appears, and n is equal to a second predetermined threshold Th2, for example 5. Optionally, times Num_m (also referred to as second times) of appearance of respective repeated representation sequences Sr_m are recorded, and the times Num_m of appearance are represented by times for which respective binary repeated representations to which repeated representations in the repeated representation set correspond appear in the conversion name set; and the binary repeated representations are used for representing conversion name segments composed of two same corresponding representation constants. For example, for the repeated representation "$hhs", the second time thereof is the time of appearance of the conversion name segment "HH". When "HHHH" appears in the conversion name set, its contribution to the times Num_m is 3 times. The repeated representation set includes all repeated representations in the current conversion name set that satisfy the condition.

In operation S203b, it is judged whether both the updated binary representation with respect to the previous binary representation set and the updated repeated representation set with respect to the previous repeated representation set do not vary. For example, after the binary representation set and the repeated representation set are updated for a first time, if the updated binary representation set varies to {Sd_1, Sd_2, . . . , Sd_99} with respect to the previous binary representation set { } (i.e., empty set) and the updated repeated representation set varies to {Sr_1, Sr_2, . . . , Sr_49} with respect to the previous repeated representation set { } (i.e., empty set), the judgment result is "No". Further, for example, after the binary representation set and the repeated representation set are updated for a third time, if the updated binary representation set varies to {Sd_1, Sd_2, . . . , Sd_99} with respect to the previous binary representation set {Sd_1, Sd_2, . . . , Sd_99, Sd_100, . . . , Sd_109} or the updated repeated representation set varies to {Sr_1, Sr_2, . . . , Sr_49} with respect to the previous repeated representation set {Sr_1, Sr_2, . . . , Sr_49, Sr_100, . . . , Sr_105}, the judgment result is "No". When the updated binary representation set is the same as the previous binary representation set (that is, no new binary representation is added) and the updated repeated representation set is the same as the previous repeated representation set (that is, no new repeated representation is added), the judgment result is "YES".

In operation S203c, substitution is performed. Specifically speaking: when the judgment result of the judging operation is "No", the representation constants in the binary representation set and the representation constants in the repeated representation set are substituted into the conversion name set to update the conversion name set. Then, the flow returns to operation S203a, so as to again perform the binary representation updating operation, the repeated representation updating operation and the judging operation. It should be noted that although in FIG. 2, the flow returns to operation S203a upon completion of the execution of operation S203c, it may also not return to operation S203a; for example, in a modification, the flow proceeds to operation S205 upon completion of the execution of operation S203c. In the specific substitution, the representation constants that are substituted into are those newly added binary representations and repeated representations (i.e., representation constants that have never appeared in the conversion name set).

Further, when the judgment result of the judging operation is "No", a substituting sequence of the respective representation constants when substituting the representation constants in the binary representation set and the representation constants in the repeated representation set into the conversion name set is determined according to the first times of the respective binary representations and the second times of the respective repeated representations.

TABLE 1

Times of Appearance of Conversion Name Segments

| $pbar = P- | 830 |
| $bard = -D | 85047 |

TABLE 1-continued

Times of Appearance of Conversion Name Segments

| $dcomma = D, | 41370 |
| $commad = ,D | 47390 |
| $dbar = D- | 134479 |
| $barp = -P | 7109 |
| $pt = PT | 10174 |
| $th = TH | 50091 |
| $ch = CH | 15966 |
| HH | 73763 |

For example, for the conversion name "P-D,D-PTHCHH" in the conversion name set, the times of appearance of the binary representations and the repeated representations are as shown in Table 1. In the case of substitution, the substituting sequence is determined according to the times of appearance: a substitution preferentially takes place if a time of appearance is more. Therefore, "$dbar" is substituted first, and the substitutions of "$commad" and "$BARP" are no longer considered since "$dbar" has been substituted into. According to such a rule, the final updating result of the conversion name is "P$bard,$dbarP$thC$hhs".

Operations 203a, 203b and 203c can be collectively called an updating operation.

When the judgment result of the judging operation is "YES", operation S205 is performed: generating the finite state automata based on the updated conversion name set.

The method 20 can be further refined. This will be described below with reference to FIG. 3.

Figure 3:
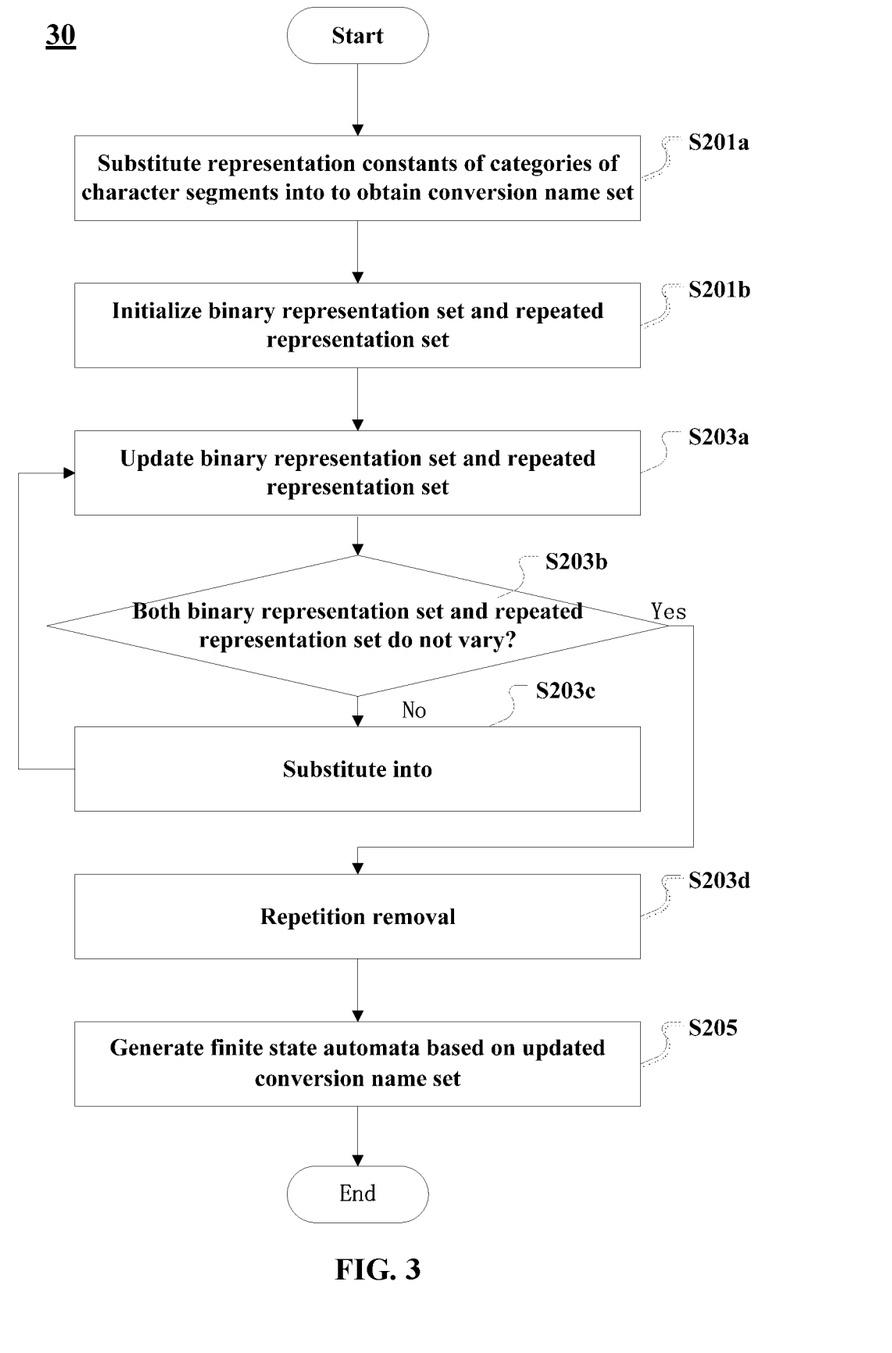
FIG. 3 shows a flowchart of a method for generating a finite state automata according to an embodiment of the present disclosure.

FIG. 3 shows a flowchart of a method 300 or generating a finite state automata according to an embodiment of the present disclosure.

It can be seen that the method 30 is substantially the same as the method 20. The same operations will not be repeatedly described here. For the newly appearing operation S203d, when the judgment result of the judging operation is "YES", operation S203d is performed: performing repetition removal for repeated conversion names in the conversion name set so that times for which the respective conversion names in the conversion name set appear are one. This is advantageous for improving the simplicity and efficiency of the finite state automata. Upon completion of operation S203d, operation S205 is performed. In the method 30, operations S203a, S203b, S203c and S203d can be collectively called an updating operation.

Optionally, the updating operation can further comprise the following merging processing. This is advantageous for improving the simplicity and efficiency of the finite state automata.

If the first conversion name and the second conversion name in the conversion name set are different only in that the representation constants at the same position are respectively the first representation constant and the second representation constant different from the first representation constant, then the first conversion name and the second conversion name are merged based on a representation pattern of "(first representation constant second representation constant)" for uniformly representing the first representation constant and the second representation constant, wherein "1" represents "or". For example:

The first conversion name:
    $ubar$tsbard<$commad>$commadbar$cce$mbardbar T$commads;

The second conversion name:
    P$tsbard<$commad>$commadbar$cce$mbardbar T$commads;

Due to the only difference in the first representation constant, it may be considered to marge them into:
a merged conversion name being:
($ubar|P)
$tsbard<$commad>$commadbar$cce$mbardbar T$commads.

If a third conversion name in the conversion name set is different from the first conversion name and the second conversion name only in that the first representation constant or the second representation constant does not exist at the same position, then the first conversion name, the second conversion name, and the third conversion name are merged based on a representation pattern of "[first representation constant|second representation constant]", wherein "[first representation constant|second representation constant]" represents that the first representation constant or the second representation constant appears zero time or one time. For example:
A third conversion name exists as follows:
$tsbard<$commad>$commadbar$cce$mbardbar T$commads;
Then, the first, second and third conversion names are merged into:
a merged conversion name being:
[$ubar|P]
$tsbard<$commad>$commadbar$cce$mbardbar T$commads.

If the second conversion name in the conversion name set can be obtained by replacing the first representation constant at a first position in the first conversion name in the conversion name set with the second representation constant, a fourth conversion in the conversion name set can be obtained by replacing the third representation constant at a second position in the first conversion name with a fourth representation constant, and with respect to the third representation constant, after the first representation constant is expanded into characters appearing in the organic compound name set, the length of the obtained character string is shorter, then the first conversion name and the second conversion name are merged based on a representation pattern of "(first representation constant second representation constant)" for uniformly representing the first representation constant and the second representation constant, without merging the first conversions name and the fourth conversion name, wherein "|" represents "or". For example:
The first conversion name:
$ubar$tsbard<$commad>$commadbar$cce$mbardbar T$commads;
The second conversion name:
P$tsbard<$commad>$commadbar$cce$mbardbar T$commads;
The fourth conversion name:
$ubar$tsbard<$commad>$commadbar$ph$mbardbar T$commads;
Since the length of $cce after being expanded is 3 and the length of $ubr after being expanded is 2, the first and second conversion names are merged and the first and fourth conversion names are merged.

A finite state automaton generated by the method for generating a finite state automata according to the present disclosure can efficiently recognize an organic chemical name in a text. A method for recognizing a chemical name in a text according to the present disclosure will be described below with reference to FIG. 4.

Figure 4:
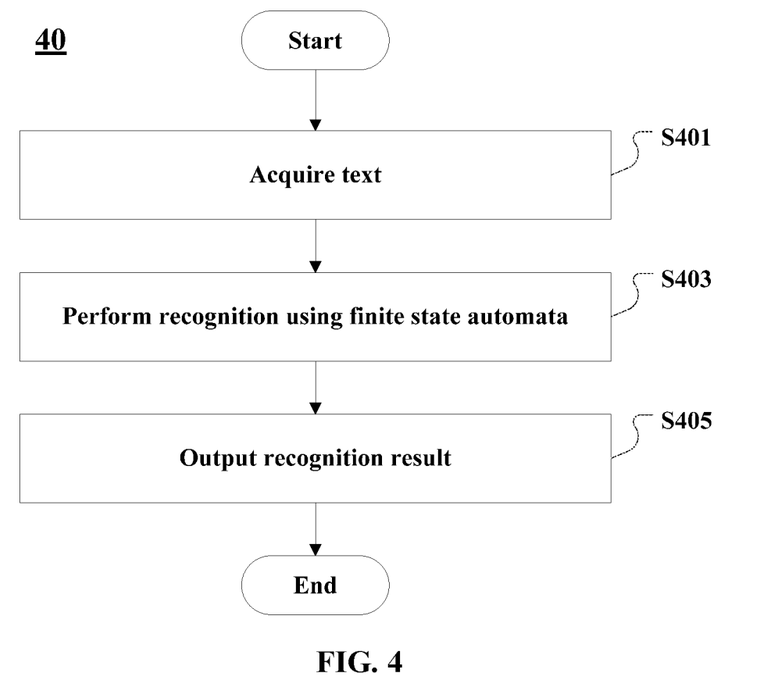
FIG. 4 shows a flowchart of a method for recognizing a chemical name in a text according to an embodiment of the present disclosure.

FIG. 4 shows a flowchart of a method 40 for recognizing a chemical name in a text according to an embodiment of the present disclosure.

In operation S401, the text is acquired. The text can originate from scientific literature, books, etc.

In operation S403, recognition is performed on the text using a finite state automata generated by the method according to the present disclosure, to extract an organic compound chemical name in the text. Optionally, the time of appearance of the extracted organic compound chemical name and the corresponding position at the time of each appearance can be recorded.

In operation S405, a recognition result comprising the extracted organic compound chemical name is outputted. The recognition result can include: the extracted organic compound chemical name. Alternatively, it further includes the time of appearance of the extracted organic compound chemical name and the corresponding position at the time of each appearance.

The present disclosure further provides a device for generating a finite state automata for recognizing an organic compound chemical name in a text. This will be described below with reference to FIG. 5.

Figure 5:
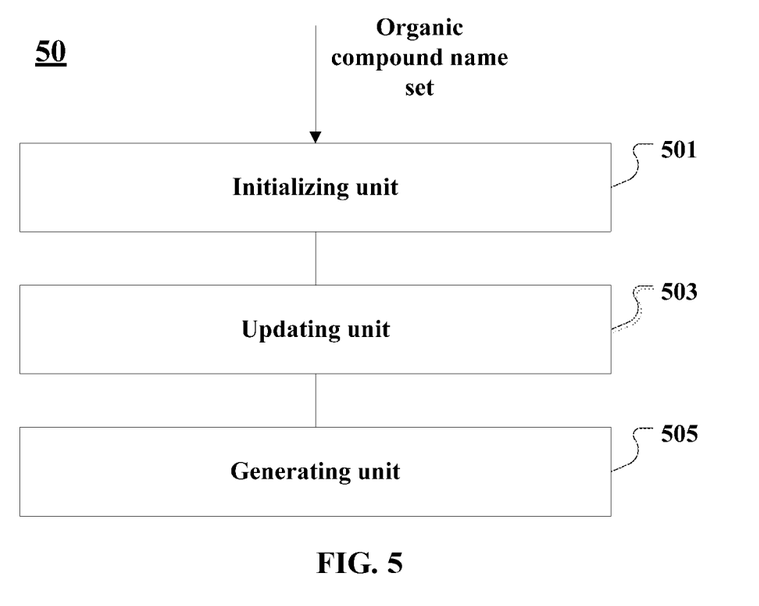
FIG. 5 shows a schematic block diagram of a device for generating a finite state automata according to an embodiment of the present disclosure.

FIG. 5 shows a schematic block diagram of a device 50 for generating a finite state automata according to an embodiment of the present disclosure.

As shown in FIG. 5, the device 50 comprises an initializing unit 501, an updating unit 503, and a generating unit 505.

The initializing unit 501 is configured to substitute representation constants of categories of character segments appearing in an organic compound name set into the organic compound name set to obtain a conversion name set. Respective organic compound names in the organic compound name set are Chinese names.

The updating unit 503 is configured to update the conversion name set based on a conversion name segment which repeatedly appears in the conversion name set.

The generating unit 505 is configured to generate the finite state automata based on the updated conversion name set.

For further specific configuration of the initializing unit 501, the updating unit 503 and the generating unit 505, reference may be made to the above-mentioned method for generating a finite state automata for recognizing a chemical name in a text.

The present disclosure further provides a storage medium with a program stored thereon, the program, when executed on an information processing apparatus, causing the information processing apparatus to implement the above-mentioned method according to the present invention. The storage medium includes, but is not limited to, a floppy disk, an optical disk, a magneto-optical disk, a memory card, a memory stick, and the like. The information processing apparatus includes at least one processor. The information processing apparatus includes: a desktop computer, a tablet computer, a portable computer, and a smartphone.

According to an aspect of the present disclosure, there is further provided an information processing apparatus.

Figure 6:
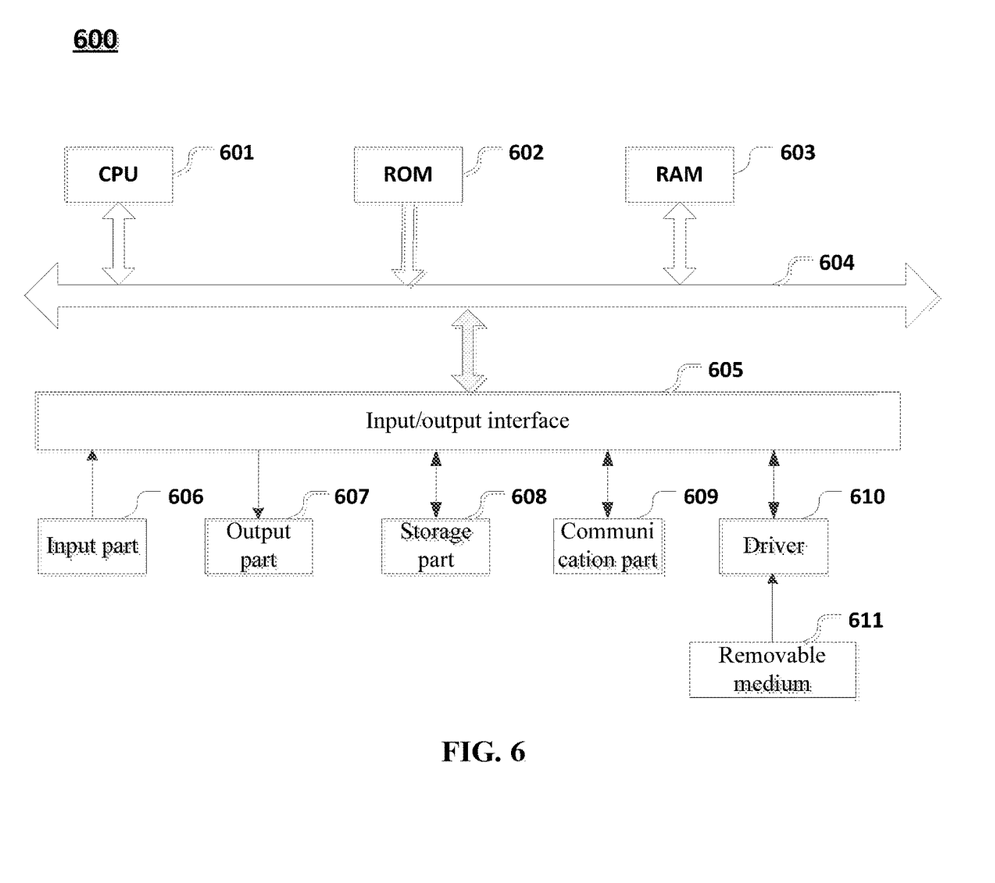
FIG. 6 is an exemplary block diagram of an information processing apparatus according to an embodiment of the present disclosure.

FIG. 6 is an exemplary block diagram of an information processing apparatus 600 according to an embodiment of the present disclosure. In FIG. 6, a central processing unit (CPU) 601 performs various processing according to a program stored in a read only memory (ROM) 602 or a program loaded from a storage part 608 to a random access memory (RAM) 603. In the RAM 603, data needed when the CPU 601 executes various processing and the like is also stored as needed.

The CPU 601, the ROM 602 and the RAM 603 are connected to each other via a bus 604. An input/output interface 605 is also connected to the bus 604.

The following components are connected to the input/output interface 605: an input part 606 including a soft keyboard and the like; an output part 607 including a display such as a liquid crystal display (LCD) and the like as well as a speaker and the like; a storage part 608 such as a hard disc; and a communication part 609 including a network interface card such as an LAN card, a modem and the like. The communication part 609 performs communication processing via a network such as the Internet, a local area network and a mobile network, or a combination thereof.

A driver 610 is also connected to the input/output interface 605 as needed. A removable medium 611 such as a semiconductor memory and the like is installed on the driver 610 as needed, so that a program read therefrom is installed to the storage part 608 as needed.

The CPU 601 can run code of a program that implements the above-mentioned method for generating a finite state automata or the above-mentioned recognizing method.

The technical solution of the present invention can automatically generate, based on an organic compound name set, a finite state automata for recognizing a chemical name in a text. The finite state automata can conveniently and efficiently recognize and extract an organic compound name in a text, and extracting the organic compound name is beneficial for subsequent analysis, processing, etc. The method of the present invention does not require very professional chemical knowledge, nor does it require training samples, nor does it require manual labeling of training samples, that is, the method for generating a finite state automata is simple and efficient. It can be understood that: if the organic compound name set is properly selected, the finite state automata of the present invention will have the characteristics of high efficiency in recognizing chemical names and high recognition rate. The method, device and computer-readable medium disclosed by the present invention at least help to achieve one of the following effects: the methods for automatically generating a recognition rule and generating a finite state automata are simple, the efficiency of recognizing chemical names is high, and the recognition rate is high.

The above apparatuses and methods of this disclosure may be implemented by hardware, or by hardware in combination with software. The method detailed herein may be carried out via hardware, software modules executed by a processor, or a combination thereof.

Although the present invention has been disclosed above by describing the specific embodiments of the present invention, it should be understood that those skilled in the art can design various modifications (including combinations or replacements of features between the respective embodiments, where feasible), improvements or equivalents to the present invention within the spirit and scope of the appended claims. Such modifications, improvements or equivalents should also be considered to be included within the scope of protection of the present invention.

It should be emphasized that the term "including/comprising" as used herein refers to the presence of a feature, an element, an operation or an assembly, but does not exclude the presence or addition of one or more other features, elements, operations or assemblies.

In addition, the methods of the respective embodiments of the present invention are not limited to be performed in the chronological order described in the specification or shown in the drawings, but may also be performed in other chronological orders, in parallel, or independently. Therefore, the execution order of the methods described in this specification does not limit the technical scope of the present invention.

Appendixes

1. A method for generating a finite state automata for recognizing a chemical name in a text, characterized in that the method comprises the following steps:

an initializing step: including substituting representation constants of categories of character segments appearing in an organic compound name set into the organic compound name set to obtain a conversion name set;

an updating step: updating the conversion name set based on a conversion name segment which repeatedly appears in the conversion name set; and a generating step: generating the finite state automata based on the updated conversion name set;

wherein respective organic compound names in the organic compound name set are Chinese names.

2. The method according to Appendix 1, wherein the initializing step further comprises a representation set initializing step: initializing a binary representation set and a repeated representation set to empty sets;

a binary representation in the binary representation is used for representing a conversion name segment of two different adjacent representation constants in the conversion name set; and a repeated representation in the repeated representation set is used for representing a conversion name segment in the conversion name set where the same representation constant continuously appears.

3. The method according to Appendix 2, wherein in the initializing substitution step, only representation constants of selected character segments appearing in the organic compound name set are substituted into the organic compound name set, the selected character segments are not ",", " ", ":", ";", "-", "(", ")", "[", "]", "{", "}", or "".

4. The method according to Appendix 1, wherein the updating step comprises:

a binary representation updating step: determining a conversion name segment of two adjacent representation constants in the conversion name set being different and setting a corresponding representation constant for the two adjacent representation constants as a binary representation to update a binary representation set, wherein respective binary representations in the binary representation set satisfy: a time for which a conversion name segment to which the binary representation correspond appear in the conversion name set is greater than a first predetermined threshold;

a repeated representation updating step: determining a conversion name segment in the conversion name set where the same representation constant continuously appears for n times or more than n times and setting a corresponding representation constant for the same representation constant as a repeated representation to update a repeated representation set, wherein each repeated representation in the repeated representation set is capable of collectively representing a conversion name segment in which the same representation constant to which the repeated representation corresponds continuously appears, and n is equal to a second predetermined threshold;

a judging step: judging whether both the updated binary representation set with respect to the previous binary representation set and the updated repeated representation set with respect to the previous repeated representation set do not vary; and a conversion name set updating step: when a judgment result of the judging step is "NO", substituting representation constants in the binary representation set and representation constants in the repeated representation set into the conversion name set to update to the conversion name set.

5. The method according to Appendix 4, wherein the updating step further comprises:
after the conversion name set updating step, again performing the binary representation updating step, the repeated representation updating step and the judging step.

6. The method according to Appendix 4, wherein when a judgment result of the judging step is "YES", the generating step is performed.

7. The method according to Appendix 4,
wherein the binary representation updating step comprises recording, as first times, times for which conversion name segments to which respective binary representations correspond appear in the conversion name set;
the repeated representation updating step comprises recording, as second times, times for which respective binary repeated representations to which repeated representations in the repeated representation set correspond appear in the conversion name set; and
the respective binary repeated representations are used for representing conversion name segments composed of two same corresponding representation constants.

8. The method according to Appendix 7, wherein the conversion name set updating step comprises:
when a judgment result of the judging step is "NO", determining, according to the first times of the respective binary representations and the second times of the respective repeated representations, a substituting sequence of the respective representation constants when substituting the representation constants in the binary representation set and the representation constants in the repeated representation set into the conversion name set.

9. The method according to Appendix 4, wherein the updating step comprises: performing repetition removal for repeated conversion names in the conversion name set so that times for which the respective conversion names in the conversion name set appear are one.

10. The method according to Appendix 1, wherein categories of characters appearing in the organic compound name set are set to comprise: Arabic numbers, Chinese Numbers, Heavenly Stems, Uppercase letters, Lowercase letters, Greek Letters, Order Characters, Prefixes, Suffixes, Conjunctions, Chemical Elements, other common words, ",", " ", ":", ";", "-", "(", ")", "[", "]", "{", "}" and "".

11. The method according to Appendix 1, wherein the generating step comprises:
generating a regular expression based on the conversion name set; and
generating the finite state automata based on the regular expression.

12. The method according to Appendix 4, wherein the second predetermined threshold is four, five, or six.

13. A device for generating a finite state automata, characterized in that the device comprises:
an initializing unit configured to substitute representation constants of categories of character segments appearing in an organic compound name set into the organic compound name set to obtain a conversion name set;
an updating unit configured to update the conversion name set based on a conversion name segment which repeatedly appears in the conversion name set; and
a generating unit configured to generate the finite state automata based on the updated conversion name set;
wherein respective organic compound names in the organic compound name set are Chinese names.

14. A storage medium with a program stored thereon, characterized in that the program, when executed on an information processing apparatus, causes the information processing apparatus to implement the following steps:
an initializing step: including substituting representation constants of categories of character segments appearing in an organic compound name set into the organic compound name set to obtain a conversion name set;
an updating step: updating the conversion name set based on a conversion name segment which repeatedly appears in the conversion name set; and
a generating step: generating the finite state automata for recognizing a chemical name in a text, based on the updated conversion name set;
wherein respective organic compound names in the organic compound name set are Chinese names.

What is claimed is:
1. A method, executed by an information processing apparatus, for generating a finite state automata for recognizing a chemical name in a text, comprising:
initializing including substituting representation constants of categories of character segments appearing in an organic compound name set into the organic compound name set to obtain a conversion name set;
updating the conversion name set based on a conversion name segment which repeatedly appears in the conversion name set; and
generating a finite state automata based on the updated conversion name set;
wherein respective organic compound names in the organic compound name set are in Chinese,
wherein the updating comprises:
determining a conversion name segment of two adjacent representation constants in the conversion name set being different and setting a corresponding representation constant for the two adjacent representation constants as a binary representation to update a binary representation set, wherein respective binary representations in a binary representation set satisfy: a time for which a conversion name segment to which the binary representation corresponds appears in the conversion name set is greater than a first predetermined threshold;
determining a conversion name segment in the conversion name set where the same representation constant continuously appears for n times or more than n times and setting a corresponding representation constant for the same representation constant as a repeated representation to update a repeated representation set, wherein each repeated representation in the repeated representation set is used for collectively representing a conversion name segment in which the same representation constant to which the repeated representation corresponds continuously appears, and n is equal to a second predetermined threshold;
judging whether both the updated binary representation set with respect to a previous binary representation set and the updated repeated representation set with respect to the previous repeated representation set do not vary; and
updating a conversion name set, when a judgment result of the judging is that at least one of the updated binary representation set and the updated repeated representation set varies, by substituting representa- tion constants in the binary representation set and representation constants in the repeated representation set into the conversion name set.

2. The method according to claim 1, wherein the initializing further comprises initialization of a representation set including initializing a binary representation set and a repeated representation set to empty sets;
   a binary representation in the binary representation set is used for representing a conversion name segment of two different adjacent representation constants in the conversion name set; and
   a repeated representation in the repeated representation set is used for representing a conversion name segment in the conversion name set where the same representation constant continuously appears.

3. The method according to claim 2, wherein in the initializing includes the substituting representation, only representation constants of selected character segments appearing in the organic compound name set are substituted into the organic compound name set, where the selected character segments are not ",", " ", ":", ";", "-", "(", ")", "[", "]", "{", "}", or """.

4. The method according to claim 1, wherein the updating further comprises:
   after the conversion name set is updated according to the updating, again performing updating of the binary representation, updating the repeated representation and the judging.

5. The method according to claim 1, wherein when the judgment result of the judging is that the updated binary representation set and the updated repeated representation set do not vary, the generating of finite state automata is performed.

6. The method according to claim 1,
   wherein the updating of the binary representation comprises recording, as first times, times for which conversion name segments to which respective binary representations correspond appear in the conversion name set;
   updating of the repeated representation updating comprises recording, as second times, times for which respective binary repeated representations to which repeated representations in the repeated representation set correspond appear in the conversion name set; and
   the respective binary repeated representations are used for representing conversion name segments composed of two same corresponding representation constants.

7. The method according to claim 6, wherein the updating of the conversion name set comprises:
   when the judgment result of the judging is that the at least one of the updated binary representation set and the updated repeated representation set varies, determining, according to the first times of the respective binary representations and the second times of the respective repeated representations, a substituting sequence of the respective representation constants when substituting the representation constants in the binary representation set and the representation constants in the repeated representation set into the conversion name set.

8. The method according to claim 1, wherein the updating comprises: performing repetition removal for repeated conversion names in the conversion name set so that times for which the respective conversion names in the conversion name set appear are one.

9. The method according to claim 1, wherein categories of characters appearing in the organic compound name set are set to comprise: Arabic numbers, Chinese Numbers, Heavenly Stems, Uppercase letters, Lowercase letters, Greek Letters, Order Characters, Prefixes, Suffixes, Conjunctions, Chemical Elements, other common words, ",", " ", ":", ";", "-", "(", ")", "[", "]", "{", "}" and """.

10. The method according to claim 1, wherein the generating comprises:
    generating a regular expression based on the conversion name set; and
    generating the finite state automata based on the regular expression.

11. The method according to claim 1, wherein the second predetermined threshold is four, five or six.

12. A device for generating a finite state automata, the device comprising:
    a memory; and
    a processor coupled to the memory and configured to:
       initializing to substitute representation constants of categories of character segments appearing in an organic compound name set into the organic compound name set to obtain a conversion name set;
       updating the conversion name set based on a conversion name segment which repeatedly appears in the conversion name set; and
       generating a finite state automata based on the updated conversion name set;
       wherein respective organic compound names in the organic compound name set are in Chinese,
    wherein the updating comprises:
       determining a conversion name segment of two adjacent representation constants in the conversion name set being different and setting a corresponding representation constant for the two adjacent representation constants as a binary representation to update a binary representation set, wherein respective binary representations in a binary representation set satisfy: a time for which a conversion name segment to which the binary representation corresponds appears in the conversion name set is greater than a first predetermined threshold;
       determining a conversion name segment in the conversion name set where the same representation constant continuously appears for n times or more than n times and setting a corresponding representation constant for the same representation constant as a repeated representation to update a repeated representation set, wherein each repeated representation in the repeated representation set is used for collectively representing a conversion name segment in which the same representation constant to which the repeated representation corresponds continuously appears, and n is equal to a second predetermined threshold;
       judging whether both the updated binary representation set with respect to a previous binary representation set and the updated repeated representation set with respect to the previous repeated representation set do not vary; and
       updating a conversion name set, when a judgment result of the judging is that at least one of the updated binary representation set and the updated repeated representation set varies, by substituting representation constants in the binary representation set and representation constants in the repeated representation set into the conversion name set.

13. A non-transitory computer-readable storage medium with a program stored thereon, where when the program is executed on an information processing apparatus, causes the information processing apparatus to implement operations comprising:

initializing including substituting representation constants of categories of character segments appearing in an organic compound name set into the organic compound name set to obtain a conversion name set;

updating the conversion name set based on a conversion name segment which repeatedly appears in the conversion name set; and     generating finite state automata for recognizing a chemical name in a text, based on the updated conversion name set;

wherein respective organic compound names in the organic compound name set are in Chinese,     wherein the updating comprises:

determining a conversion name segment of two adjacent representation constants in the conversion name set being different and setting a corresponding representation constant for the two adjacent representation constants as a binary representation to update a binary representation set, wherein respective binary representations in a binary representation set satisfy: a time for which a conversion name segment to which the binary representation corresponds appears in the conversion name set is greater than a first predetermined threshold;

determining a conversion name segment in the conversion name set where the same representation constant continuously appears for n times or more than n times and setting a corresponding representation constant for the same representation constant as a repeated representation to update a repeated representation set, wherein each repeated representation in the repeated representation set is used for collectively representing a conversion name segment in which the same representation constant to which the repeated representation corresponds continuously appears, and n is equal to a second predetermined threshold;

judging whether both the updated binary representation set with respect to a previous binary representation set and the updated repeated representation set with respect to the previous repeated representation set do not vary; and     updating a conversion name set, when a judgment result of the judging is that at least one of the updated binary representation set and the updated repeated representation set varies, by substituting representation constants in the binary representation set and representation constants in the repeated representation set into the conversion name set.

* * * * *